United States Patent
Mardiks

(10) Patent No.: US 7,865,351 B2
(45) Date of Patent: Jan. 4, 2011

(54) DEVICE AND METHOD FOR AUTOMATICALLY LAUNCHING APPLICATIONS RESIDING ON USB FLASH DRIVES

(75) Inventor: Eitan Mardiks, Ra'anana (IL)

(73) Assignee: SanDisk IL Ltd., Kfar Saba (IL)

( * ) Notice: Subject to any disclaimer, the term of this patent is extended or adjusted under 35 U.S.C. 154(b) by 65 days.

(21) Appl. No.: 11/967,205

(22) Filed: Dec. 30, 2007

(65) Prior Publication Data
US 2009/0172219 A1    Jul. 2, 2009

(51) Int. Cl.
G06F 17/50    (2006.01)
G06F 13/10    (2006.01)
G06F 9/45     (2006.01)
G06F 9/455    (2006.01)
G06F 13/12    (2006.01)

(52) U.S. Cl. .............. 703/24; 703/13; 703/21; 703/22; 703/23; 703/25; 703/26; 710/62; 710/65; 710/67; 710/73

(58) Field of Classification Search .......... 703/13, 703/21, 22, 23, 24, 25, 26; 710/1, 62, 65, 710/67, 72, 73
See application file for complete search history.

(56) References Cited

U.S. PATENT DOCUMENTS 6,704,824 B1 *   3/2004  Goodman ............... 710/300
2003/0046447 A1   3/2003  Kouperchliak et al.
2005/0240692 A1 * 10/2005 Li .......................... 710/62
2006/0273154 A1  12/2006  Dan
2008/0278580 A1 * 11/2008 Bentkovski .............. 348/143
2009/0094621 A1 *  4/2009 Bunger et al. ............ 719/327
2009/0216100 A1 *  8/2009 Ebner et al. .............. 600/347

FOREIGN PATENT DOCUMENTS

WO    WO 2007/077439    7/2007

OTHER PUBLICATIONS

International Search Report and Written Opinion received in corresponding PCT Application No. PCT/IL2008/000041 from the International Searching Authority (EPO) mailed Sep. 2, 2008, 12 pages.

* cited by examiner

Primary Examiner—Alford W Kindred
Assistant Examiner—Richard Franklin
(74) Attorney, Agent, or Firm—Toler Law Group

(57) ABSTRACT

A USB peripheral device may automatically launch an application residing in its memory after it is connected to a host or after restarting the host if the USB flash drive has already been connected. Alternatively, the USB peripheral \device can automatically launch an application residing on the host or on a network, which is accessible by the host. The USB peripheral device has a USB interface and a controller, which is operative to execute instructions for sending and receiving messages through the USB interface. The controller is further operative, when executing the instructions, to send to a host a stream of emulated keystrokes, which emulated keystrokes cause the host to generate and execute a startup script. Embodiments of the invention include a USB peripheral device able to control a host and a method of using a USB peripheral device to control a host.

25 Claims, 4 Drawing Sheets

DEVICE AND METHOD FOR AUTOMATICALLY LAUNCHING APPLICATIONS RESIDING ON USB FLASH DRIVES

BACKGROUND

The Universal Serial Bus (USB) standard provides communication protocols for interfacing between a host and its peripheral devices. For example, a personal computer implementing the Microsoft Windows® operating system may use the USB standard for communicating with a keyboard, a compact disc (CD) player, or a USB flash drive. The USB standard may also be implemented in Macintosh® and Linux® operating systems.

The USB standard specifies how a peripheral device identifies itself to its host. When a USB peripheral device is connected to a host, it receives power from the host, and the host recognizes that the USB peripheral device is attached. The host then reads the peripheral device's class, subclass, etc. according to the USB standard to determine how to interface appropriately. For example, if the host determines that the peripheral device is a keyboard, the host associates the appropriate driver software with data sent from the keyboard. Details of this procedure can be found in the documentation for the USB standard.

CD players and USB flash drives belong to the USB mass storage device class, the devices in which class offer functionality not offered by peripheral devices in the human interface device (HID) class, the class that includes the keyboard. CDs and USB flash drives can store thereon applications for execution, and, for the CD players, the USB standard provides the option of including specially-designated files on the CD, which enable the application to launch automatically after the CD is loaded into the CD player. (Details of this procedure also can be found in documentation for the USB standard.)

The USB standard does not provide the option of automatically launching a program residing on a USB flash drive after the USB flash drive is simply connected to the host. Instead, the host must receive an additional command, which is an added step for the user if he or she must provide the command. To relieve the user of the burden, a host could be configured to provide the additional command upon sensing connection with a USB flash drive, but the automatic launching capability would be limited to only those hosts that are specially-configured.

Accordingly, it would be desirable to configure a USB flash drive so that, upon connection to a host supporting the USB standard, or upon restarting the host if the USB flash drive were already connected, the USB flash drive would automatically launch an application residing in its memory.

SUMMARY

A design approach based in part on the foregoing observations enables a USB flash drive to automatically launch an application residing in its memory after it is connected to a host or after restarting a host, if the USB flash drive is already connected thereto. Various embodiments are possible, including a USB peripheral device able to control a host and a method of using such USB peripheral device.

In one embodiment, a USB peripheral device is provided for controlling a host. The USB peripheral device includes a USB interface and a controller, which is operative to execute instructions for sending and receiving messages through the USB interface. The controller is further operative, when executing the instructions, to send to a host a stream of emulated keystrokes, which emulated keystrokes cause the host to generate and execute a startup script.

The startup script may be operative to cause the host to send to the USB interface a message confirming execution of the startup script. Also, the startup script may be operative to cause the host to identify the USB peripheral device as having sent the stream of emulated keystrokes to the host, the identification being made on the basis of an identification code uniquely identifying the USB peripheral device. Additionally, the startup script may be operative to cause the host to execute an application that the host accesses through a network interface. Further, the startup script may be operative to cause the host to execute an application residing in the host.

The USB peripheral device may further include a non-volatile memory. The startup script can be operative to cause the host to execute an application residing in the non-volatile memory.

In another embodiment, a method is provided for using a USB peripheral device to control a host. The method includes receiving a request for data from a host and, in response to the request, sending a stream of emulated keystrokes from the USB peripheral device to the host. The emulated keystrokes cause the host to generate and execute a startup script. The method may include receiving power from the host and performing initialization of the USB device.

The startup script may cause the host to send to the USB peripheral device a message confirming execution of the startup script. Also, the startup script may cause the host to identify the USB peripheral device as having sent the stream of emulated keystrokes to the host, the identification being made on the basis of an identification code uniquely identifying the USB peripheral device. Additionally, the startup script may cause the host to execute an application residing in the USB peripheral device. Further, the startup script may cause the host to execute an application that the host accesses through a network interface. Also, the startup script may cause the host to execute an application residing in the host.

These and other embodiments, and features, aspects and advantages thereof will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the various embodiment and together with the description, serve to explain them in greater detail. Wherever convenient, the same reference numbers are used in different drawings to refer to the same or like elements, wherein.

DETAILED DESCRIPTION

The claims appended hereto will be better understood by referring to the detailed description of the various embodiments provided as follows. This description is not intended to limit the scope of claims but instead to explain the design principles and various example embodiments that implement them. Example embodiments include a USB peripheral device, which is able to control a host, and a method of using a USB peripheral device to control a host.

Figure 1A:
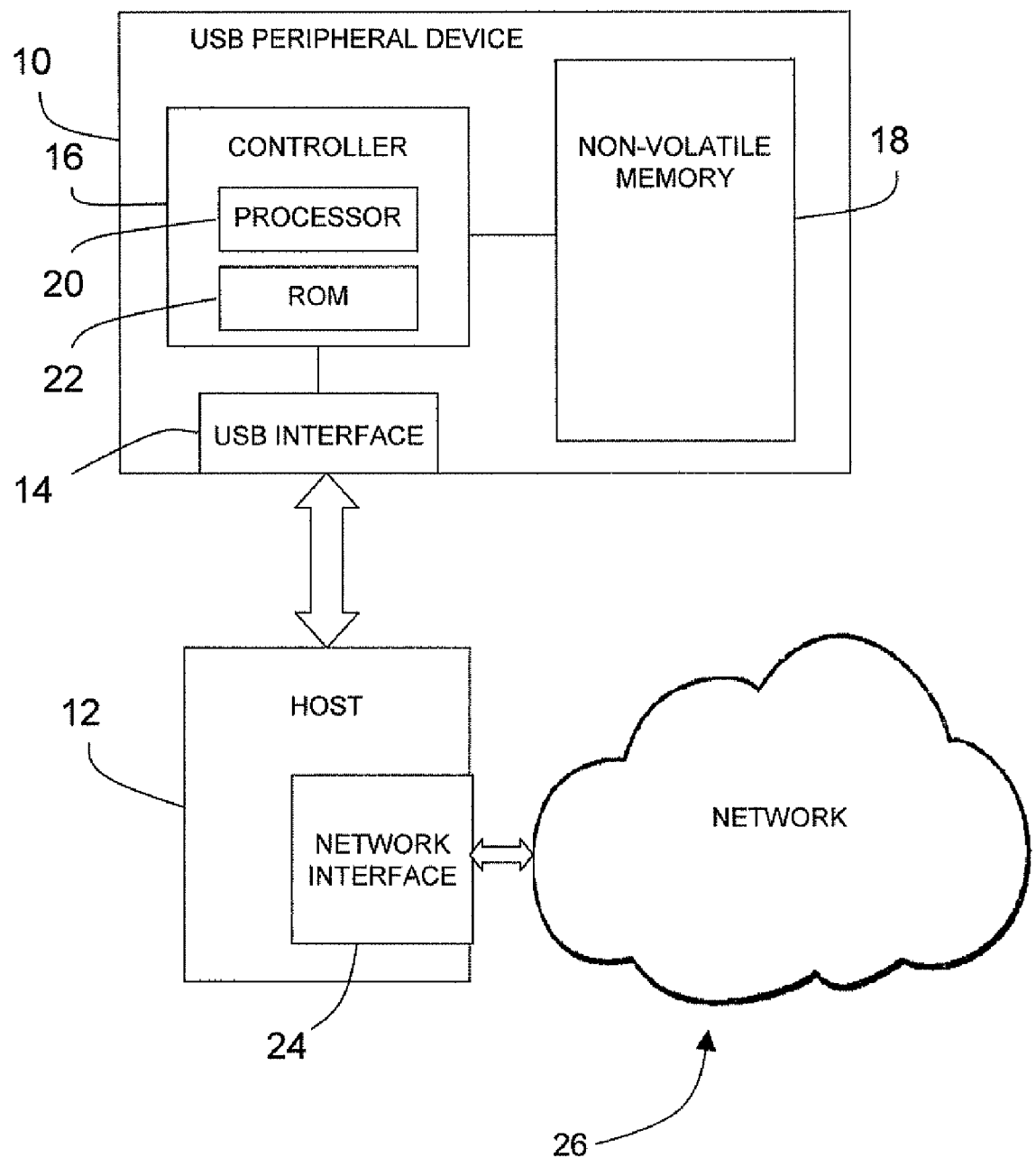
FIG. 1A illustrates a USB peripheral device and its environment in accordance with an example embodiment.

FIG. 1A illustrates an example embodiment of a USB peripheral device, which is able to control a host. FIG. 1A shows a USB peripheral device 10, which controls a host 12. The USB peripheral device 10 includes a USB interface 14, a controller 16, and a non-volatile memory 18. The controller 16, which has a processor 20 and a ROM 22, executes instructions for sending and receiving messages through the USB interface 14. When executing the instructions, the controller 16 may send to the host 12 a stream of emulated keystrokes, which cause the host 12 to generate and execute a startup script. The instructions may reside in the ROM 22 or the non-volatile memory 18.

Figure 1B:
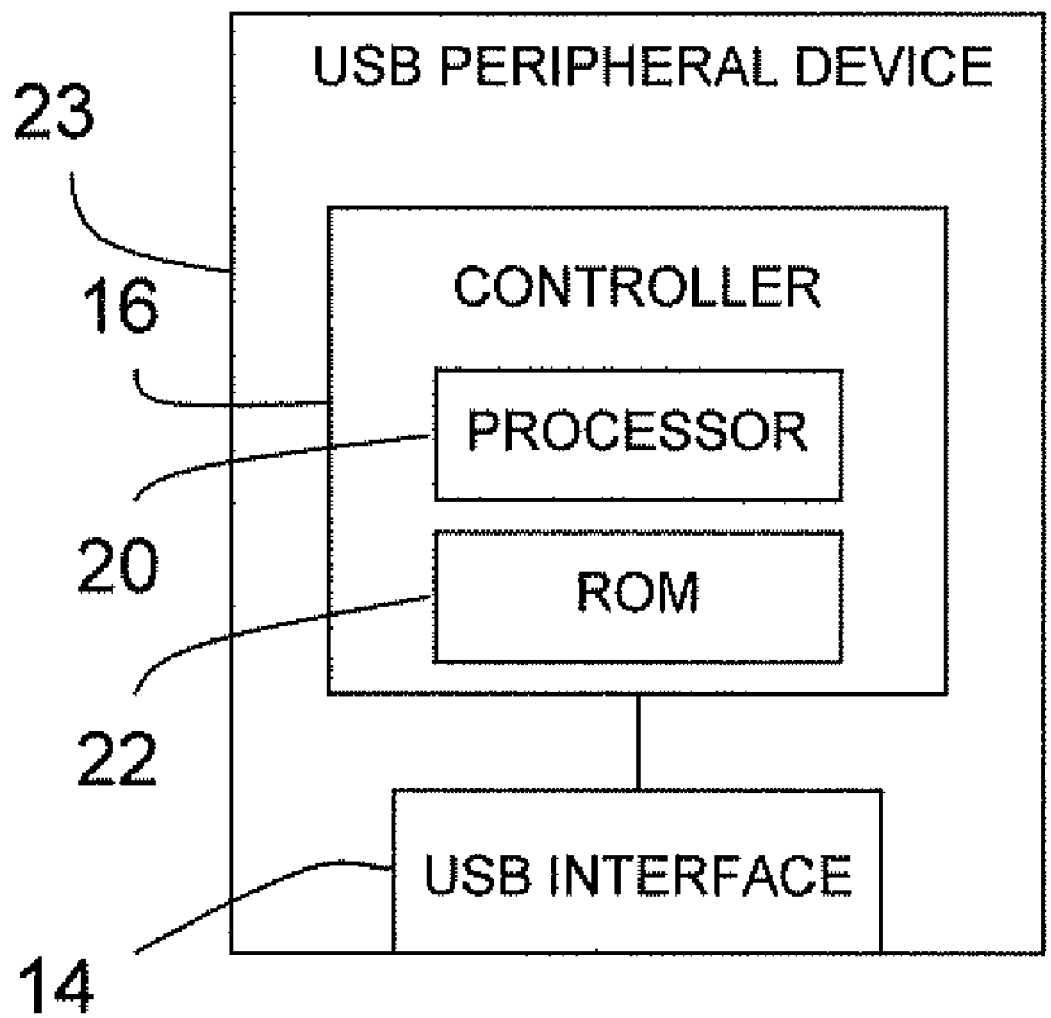
FIG. 1B illustrates a USB peripheral device in accordance with an alternate example embodiment.

The non-volatile memory 18 may be a NAND flash memory, but the invention is not limited to such implementation. Also, because the instructions for the controller 16 may reside in the ROM 22, an alternative USB peripheral device 23 may be implemented without the non-volatile memory 18, as shown in FIG. 1B.

With reference again to FIG. 1A, the messages that the controller 16 receives through the USB interface 14 may include messages to read from, write to, or erase portions of the non-volatile memory 18. The messages that controller 16 sends through the USB interface 14 may include data that the host requested. The term "message" is used broadly in the present disclosure and is intended to include any carrier of information, such as commands, signals and the like, as will be appreciated by one of ordinary skill in the art.

The startup script may be written so as to cause the host 12 to send to the USB interface 14 a message confirming that the host 12 is executing the startup script. For example, the startup script may be written so as to cause the host 12 to send to the USB peripheral device 10 a message such as a message that a host 12 would send to a keyboard to illuminate its Caps Lock indicator. The controller 16 can be programmed to recognize this message as confirmation that the startup script is executing, and the controller 16 can be further programmed to cease operation or to repeat designated previous steps if it does not receive such confirmation. Programming to cease the operation upon non-receipt of the confirmation from the host could prevent a host from malfunctioning when attempting to execute tasks that are unrelated to the startup script. A malfunction might occur if a host, which is not compatible with the startup script of the USB peripheral device 10, receives the wrong sequence of emulated keystrokes.

Additionally, the startup script may be written to cause the host 12 to identify the USB peripheral device 10, out of all the peripheral devices connected to the host 12, as the source of the stream of emulated keystrokes. Such identification can be made on the basis of an identification code uniquely identifying the USB peripheral device. The identification code would be written into the startup script. (An example is provided below of a startup script, which causes a host to search for a peripheral device having the serial number "26214575" and thus to identify the peripheral device that sent the stream of emulated keystrokes as the source of the stream of emulated keystrokes.)

An application may reside on the non-volatile memory 18. Accordingly, the startup script may be written to cause the host 12 to execute the application. A specific example of this will be discussed below.

Typically, the host 12 will include a network interface 24 through which the host 12 can access a network 26. Example network interfaces are wired interfaces, such as Ethernet interfaces, and wireless interfaces, such as Wireless Fidelity (Wi-Fi) and Bluetooth interfaces. Example networks are a local area network (LAN) and the Internet. For such environments, the startup script may be written to cause the host 12 to execute through the network interface 24 an application residing on the network 26. For example, the startup script could access a server through the network 26 and register the user on that server.

The startup script may be written to cause the host 12 to execute an application residing thereon instead of on the USB peripheral device 10 or on the network 26. For example, the startup script could cause the host to open a web browser and then direct the web browser to a particular location. Such capability can be useful for example in a USB flash drive having the form factor of a business card. (For an example of such a USB flash drive, reference is made to U.S. Patent Application Publication No. 2006/0273154.) A business may then distribute such a USB flash drive in place of a traditional business card so that, in addition to providing information printed thereon, the "card" can also generate a startup script that automatically directs the recipient to a particular web site with special features without the recipient having to type a complex URL.

Figure 2A:
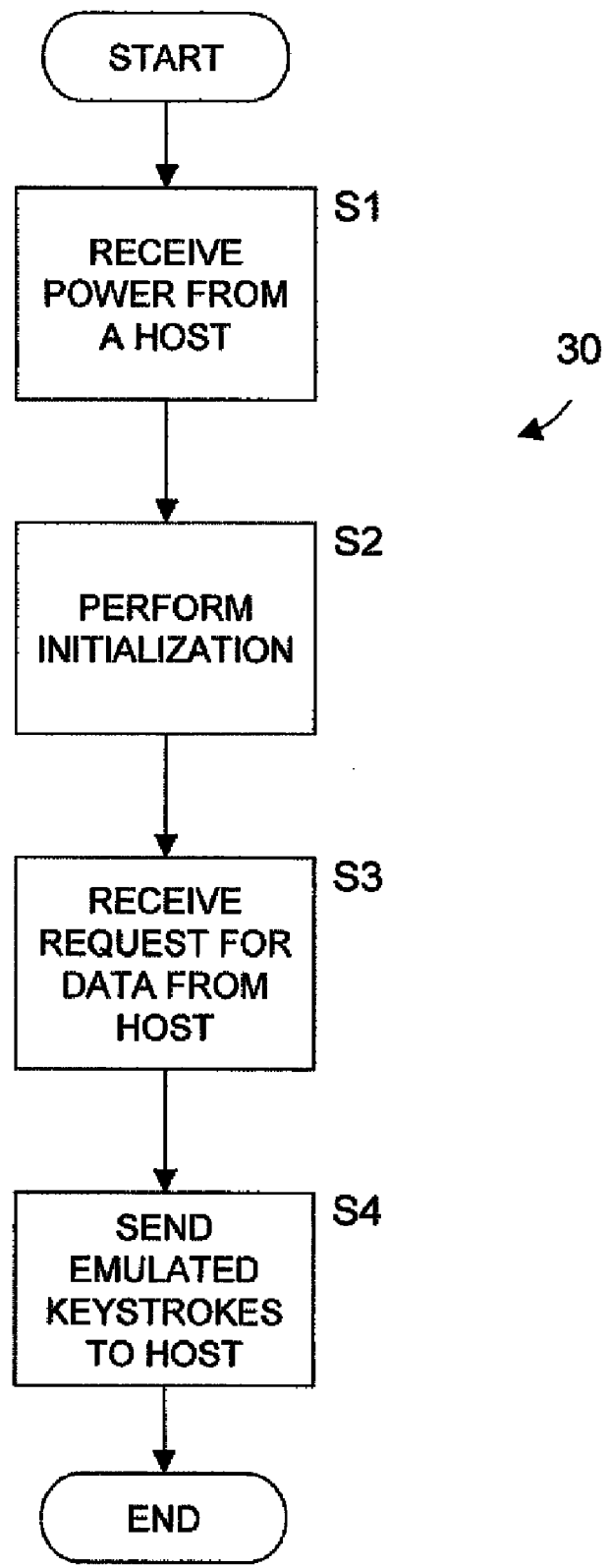
FIG. 2A illustrates a flow chart of a method of using a USB peripheral device in accordance with an example embodiment.

According to another embodiment, a method of using a USB peripheral device to control a host is provided. FIG. 2A illustrates a flowchart 30 of such a method. The method begins after connecting a USB peripheral device to a host or after restarting the host, if the USB flash drive is already connected.

The USB peripheral device receives power from the host (step S1), which causes the host to recognize that the USB peripheral device is attached. The host then reads the class of the USB peripheral device, which is set to be that of a keyboard. Accordingly, the host uses its USB keyboard driver for communications with the USB peripheral device.

The USB peripheral device performs initialization (step S2). Then, the host periodically sends requests for data to the USB peripheral device.

At step S3, the USB peripheral device receives one of the requests for data from the host. At step S4, a stream of emulated keystrokes is sent from the USB peripheral device to the host. The emulated keystrokes sent cause the host to generate and execute a startup script, as if a user were to manually type the corresponding keystrokes on a keyboard.

Figure 2B:
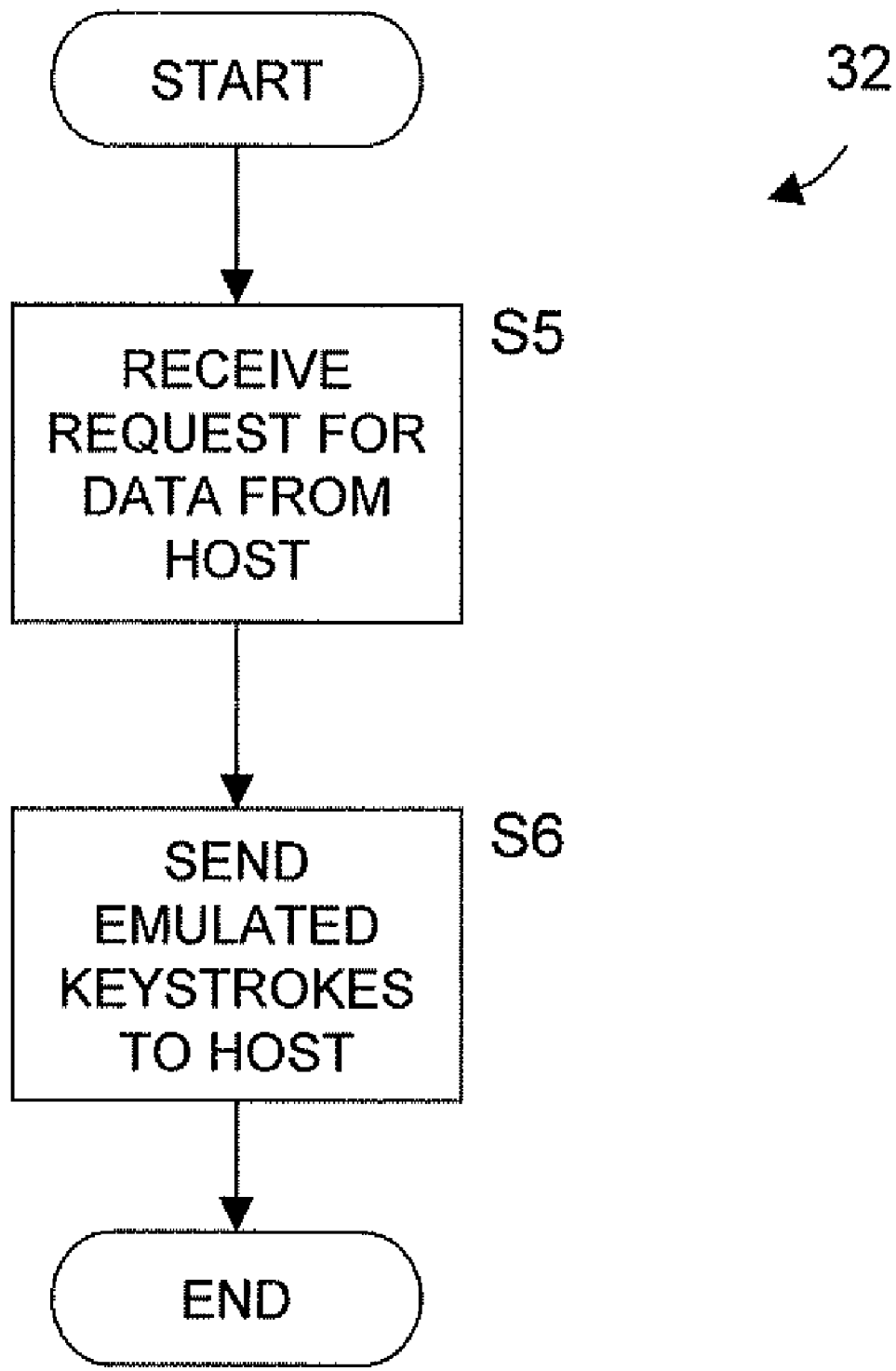
FIG. 2B illustrates a flow chart of an alternate method of using a USB peripheral device in accordance with an example embodiment.

Although this example embodiment is described as having the four steps S1-S4, FIG. 2B shows a flow chart 32 of a method according to an alternative example embodiment, the method including only the latter two steps, which are relabeled as S5 and S6 to avoid confusion.

In the following, a non-limiting example is described where a suitable stream of emulated keystrokes starts an application residing in the memory of the USB peripheral device. In this example, the USB peripheral device has an identification code, which uniquely identifies the USB peripheral device.

This process of starting an application uses the VBSCRIPT script processing task, but analogous processes can use other scripts, such as C or Java. VBSCRIPT is available with Microsoft Windows version 2000 and later versions.

To begin generating the startup script, the stream of emulated keystroke from the USB peripheral device initiates a "start," a "run," and then the following character string:

cmd/C "copy con %temp%\arun12345.vbs"

These emulated keystrokes create and open a file named "araun12345.vbs" on a Windows® temp directory. Subsequent emulated keystrokes enter characters into the file as follows:

The emulated keystrokes "type" the following script:
Set FileSystemObject=CreateObject("Scripting.FileSystemObject")
Set Drives=FileSystemObject.Drives
For Each DiskDrive in Drives
if DiskDrive.IsReady then
if DiskDrive.SerialNumber=26214575 then
Str=DiskDrive.DriveLetter & ":\KeySafe.exe"
Set wshShell=CreateObject ("WSCript.shell")
wshshell.run str, 6, True
set wshshell=nothing
end if
end if
Next The emulated keystrokes then "type" "^Z" to close the file.

As is apparent from the peripheral device serial number and the application name provided in the script above, when above script runs, it causes the host to search for a peripheral device having the serial number "26214575." When this peripheral device is found, the script starts an application residing on the peripheral device that is named "KeySafe." Then, the process proceeds by emulating keystrokes to "type" the following, which executes the newly created file:
%temp%\arun12345.vbs As explained, the sample stream of emulated keystrokes described above generates and executes a startup script, which starts an application residing on the USB peripheral device. As is evident in view of the earlier discussions, modifications of the stream of emulated keystrokes can produce startup scripts with different functionalities, for example, to cause the host to send to the USB peripheral device a message confirming execution of the startup script, to cause the host to execute an application that the host accesses through a network interface, or to cause the host to execute an application residing in the host.

As yet another alternative to the example embodiments described above, a method of using a USB peripheral device to control a host may implement sending emulated keystrokes to cause the host to open the Microsoft® Notepad utility to generate a startup script. It is not necessary to use the VBSCRIPT script processing task for this embodiment.

Having thus described the foregoing exemplary embodiments it will be apparent to those skilled in the art that various equivalents, alterations, modifications, and improvements thereof are possible without departing from the scope and spirit of the claims as hereafter recited. Accordingly, the claims are not limited to the foregoing discussion.

I claim:

1. A Universal Serial Bus (USB) peripheral device able to control a host, the USB peripheral device comprising:
   a USB interface; and
   a controller operative to execute instructions for sending and receiving messages through the USB interface;
   wherein the controller is further operative, when executing the instructions, to send to a host a stream of emulated keystrokes for causing the host to generate a startup script and to confirm execution of the startup script by sending a message to the USB peripheral device, the message including an emulated keystroke instruction, wherein the controller is operative to recognize the message as a confirmation of the execution of the startup script and to resend at least one of the emulated keystrokes to the host when the execution is unconfirmed, and wherein continued execution of the instructions depends upon receiving such confirmation.

2. The USB peripheral device of claim 1, wherein the startup script is operative to cause the host to identify the USB peripheral device as having sent the stream of emulated keystrokes to the host, the identification being made on the basis of an identification code uniquely identifying the USB peripheral device.

3. The USB peripheral device of claim 1, further comprising:
   a non-volatile memory,
   wherein the startup script is operative to cause the host to execute an application residing in the non-volatile memory.

4. The USB peripheral device of claim 1, wherein the startup script is operative to cause the host to execute an application that the host accesses through a network interface.

5. The USB peripheral device of claim 1, wherein the startup script is operative to cause the host to execute an application residing in the host.

6. The USB peripheral device of claim 1, wherein the controller is operative to stop executing the instructions.

7. The USB peripheral device of claim 1, wherein the message includes a protocol associated with a keyboard of the host.

8. The USB peripheral device of claim 1, wherein the message is generated by a host driver associated with a keyboard of the host.

9. The method of claim 1, wherein a plurality of requests for data are periodically received at the USB interface from the host.

10. A method of using a Universal Serial Bus (USB) peripheral device to control a host, the method comprising:
    at the USB peripheral device, performing:
    receiving a request for data from a host;
    in response to the request, sending a stream of emulated keystrokes from the USB peripheral device to the host, the emulated keystrokes for causing the host to generate a startup script and to confirm execution of the startup script by sending a message including an emulated keystroke instruction, wherein the controller is operative to recognize the message as a confirmation of the execution of the startup script; and
    resending at least one of the emulated keystrokes to the host when the execution of the startup script is unconfirmed, wherein execution of instructions for communicating messages through the USB peripheral device depends upon receiving the confirmation of the execution of the startup script.

11. The method of claim 10, wherein the startup script causes the host to identify the USB peripheral device as having sent the stream of emulated keystrokes to the host, the identification being made on the basis of an identification code uniquely identifying the USB peripheral device.

12. The method of claim 10, wherein the startup script causes the host to execute an application residing in the USB peripheral device.

13. The method of claim 10, wherein the startup script causes the host to execute an application that the host accesses through a network interface.

14. The method of claim 10, wherein the startup script causes the host to execute an application residing in the host.

15. The method of claim 10, further comprising:
    receiving power from the host; and
    performing initialization of the USB peripheral device.

16. The method of claim 10, wherein the message includes a protocol associated with a keyboard of the host.

17. A method of communicating with a Universal Serial Bus (USB) peripheral device, the method comprising:
at a host device operatively coupled to the USB peripheral device, performing:
sending a request for data to the USB peripheral device;
receiving emulated keystrokes from the USB peripheral device;
attempting to execute a startup script in response to the emulated keystrokes,
wherein execution of instructions for communicating with the USB peripheral device depends upon confirming execution of the startup script; and
sending a message including an emulated keystroke instruction to the USB peripheral device, wherein sending the message confirms execution of the startup script to the USB peripheral device.

18. The method of claim 17, further comprising executing the startup script.

19. The method of claim 17, further comprising executing the instructions for communicating with the USB peripheral device.

20. The method of claim 17, further comprising generating the startup script in response to receiving the emulated keystrokes.

21. The method of claim 17, further comprising periodically sending one of a plurality of requests for data to the USB peripheral device.

22. A method of using a Universal Serial Bus (USB) peripheral device to control a host, the method comprising:
at the USB peripheral device, upon detecting that the USB peripheral device is coupled to the host:
sending a first stream of emulated keystrokes to the host to cause creation of a startup script at the host;
sending a second stream of emulated keystrokes to the host to cause execution of the startup script at the host;
receiving from the host, a message confirming execution of the startup script at the host, the message including an emulated keystroke instruction, and recognizing the message as a confirmation of the execution of the startup script; and
wherein the execution of the startup script at the host launches an application stored at the USB peripheral device.

23. The method of claim 22, wherein the first stream of emulated keystrokes comprises:
first emulated keystrokes to open a script file at the host;
second emulated keystrokes to enter one or more script commands into the script file; and
third emulated keystrokes to save and close the script file at the host.

24. The method of claim 23, wherein the script file is created at the host only after the host receives the first stream of emulated keystrokes from the USB peripheral device.

25. The method of claim 22, wherein the startup script includes a name of the application stored at the USB peripheral device.

* * * * *